United States Patent
Bhadoriya et al.

(10) Patent No.: US 10,789,273 B1
(45) Date of Patent: Sep. 29, 2020

(54) RESOURCE IDENTIFIER ALLOCATION DURING NETWORK PARTITIONS

(71) Applicant: Amazon Technologies, Inc., Seattle, WA (US)

(72) Inventors: Anirudha Singh Bhadoriya, Seattle, WA (US); Ankit Singh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 212 days.

(21) Appl. No.: 15/820,306

(22) Filed: Nov. 21, 2017

(51) Int. Cl.
    *G06F 16/27* (2019.01)
    *G06F 16/25* (2019.01)
    *G06F 16/22* (2019.01)
    *G06F 16/23* (2019.01)

(52) U.S. Cl.
    CPC ........ *G06F 16/278* (2019.01); *G06F 16/2282* (2019.01); *G06F 16/2379* (2019.01); *G06F 16/258* (2019.01)

(58) Field of Classification Search
None
See application file for complete search history.

(56) References Cited

U.S. PATENT DOCUMENTS

2017/0139910 A1* 5/2017 Mcalister ............ G06F 16/1727

OTHER PUBLICATIONS

All_Tab_Partitions [date unknown (captured on Jun. 10, 12, by archive.org)], Oracle, https://web.archive.org/web/20120610020436/ https://docs.oracle.com/cd/B28359_01/server.111/b28320/statviews_2096.htm.*

Hughes, "Partitioned" Cluster Networks Aug. 8, 11, Microsoft, https://blogs.technet.microsoft.com/askcore/2011/08/08/partitioned-cluster-networks/.*

Circular Queue Tutorial [date unknown (captured on Nov. 16, 19, by archive.org)], includehelp.com, https://web.archive.org/web/20161119110121/https://www.includehelp.com/data-structure-tutorial/circular-queue-in-data-structure-using-c-and-cpp.aspx.*

Hussain, The Evolution of Software-Defined Radio: An Introduction Dec. 17, Abstract.*

* cited by examiner

*Primary Examiner* — Jason G Liao

(74) *Attorney, Agent, or Firm* — Davis Wright Tremaine LLP

(57) ABSTRACT

A database management system provisions a database server that replicates assignments of resource identifiers to resources that are managed by another database server. Based at least in part on assignment of existing sets of identifiers to other database servers, the database management system identifies a set of identifiers that is distinct from these existing sets and assigns this set of identifiers to the provisioned database server. If the database management system detects an event that causes the database server to lose its ability to receive these assignments of identifiers from the other server, the database management system enables the database server to assign identifiers from its assigned set of identifiers.

20 Claims, 7 Drawing Sheets

RESOURCE IDENTIFIER ALLOCATION DURING NETWORK PARTITIONS

BACKGROUND

Service providers often rely on various databases to manage data associated with resources provided by the server providers to their customers. For instance, as resources are provisioned or stored, a service provider utilizes a database server to assign unique identifiers to each of these resources to enable the service provider or a customer to easily locate a resource. However, during a network partition, a new database server can be assigned to assign unique identifiers to each of these resources, in addition to any existing database server that may be performing the same operations. This can cause the same identifier to be assigned to multiple resources, resulting in data corruption or data leakage to unauthorized entities.

BRIEF DESCRIPTION OF THE DRAWINGS

Various techniques will be described with reference to the drawings, in which.

DETAILED DESCRIPTION

Figure 1:
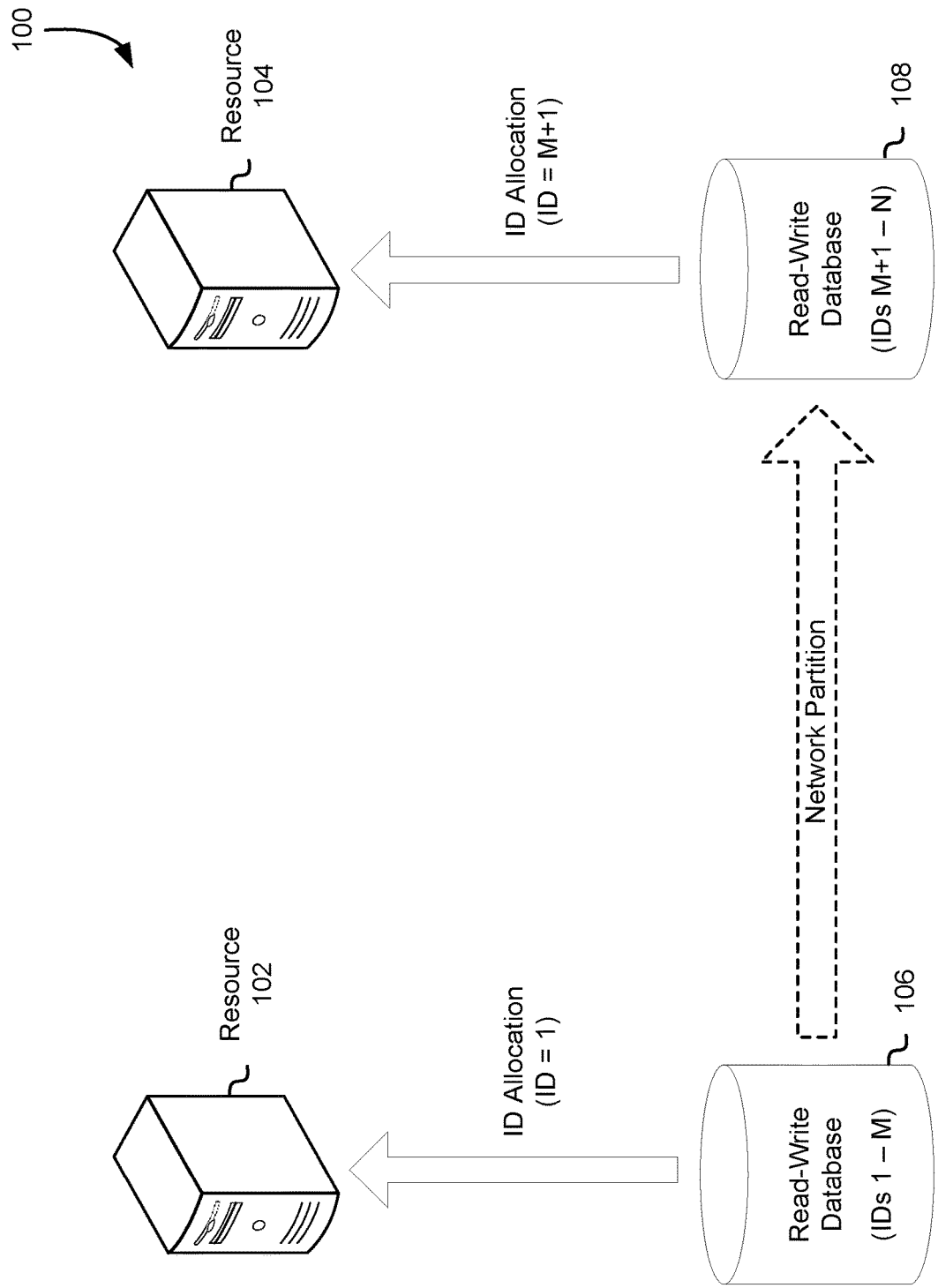
FIG. 1 shows an illustrative example of an environment in which various embodiments can be implemented.

This patent disclosure relates to techniques for assignment of distinct resource identifier ranges to database servers to prevent the same identifier from being allocated to multiple resources. In one example, a computing resource service provider maintains a variety of database servers for the maintenance of metadata associated with resources provided by the computing resource service provider to its customers. These database servers may include read-write servers, which may allocate resource identifiers to resources allocated by the computing resource service provider. Additionally, these database servers may include a variety of read-only servers, which may provide metadata corresponding to resources provided by the computing resource service provider to customers. These database servers, in an example, are maintained in a variety of data zones, which may correspond to isolated locations within a geographic region, which may redundantly store data, such as metadata corresponding to resources vended by the computing resource service provider, within the particular geographic region. In an example, the computing resource service provider provisions a new database server partition to support customer demand for metadata within a particular data region. This new server partition may be a read-write database server or a read-only database server, dependent on the requirements of the computing resource service provider.

In an example, the computing resource service provider identifies the existing resource identifier ranges assigned to the other database servers used for maintenance of resource metadata. For instance, the computing resource service provider may maintain a data table specifying the resource identifier ranges assigned to each database server maintained by the computing resource service provider. Using this information, the computing resource service provider may identify the available resource identifier ranges that have not been assigned to other database servers. The computing resource service provider may assign an available resource identifier range to the newly provisioned database server and record this assignment in the data table to prevent assignment of this range to another database server. In an example, the computing resource service provider assigns resource identifier ranges to each database server, regardless of whether the database server is a read-write database server or a read-only database server.

In an example, in the event of a network partition whereby a read-write database server is partitioned out, the computing resource service provider converts an existing read-only database server within an impacted data zone into a read-write database server. This read-write database server may process incoming requests for resource identifiers. In an example, since each database server is assigned with a unique range of resource identifiers, the read-write database server may allocate resource identifiers within its assigned range in response to requests to obtain resource identifiers for newly allocated resources. In an example, in response to a request to obtain a resource identifier, the read-write database server determines whether there are sufficient resource identifiers for allocation to the specified resources. For instance, as resource identifiers are provided to newly allocated resources, the read-write database server may update another database to indicate the remaining identifiers in its corresponding resource identifier range. If the read-write database server does not have sufficient resource identifiers to fulfill the incoming request, the read-write database server may indicate that identifiers are not available from the database server and may provide information regarding another database server available that may vend resource identifiers. Additionally, the read-write database server may transmit a notification to the computing resource service provider indicating the lack of identifiers available. This may cause the computing resource service provider to allocate another unique identifier range to the read-write database server or to provision another database server for vending resource identifiers.

In this manner, distinct resource identifier ranges may be assigned to each database server that can serve as a read-write database server for allocation of resource identifiers, thus preventing these database servers from allocating the same resource identifier to different resources. Additionally, the techniques described and suggested herein facilitate additional technical advantages. For example, because read-only database servers are also assigned with a unique resource identifier range along with the read-write database servers, no additional configuration of the read-only database servers need be performed in the event of a network partition and conversion of the read-only database servers into read-write database servers.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which various embodiments can be implemented. In the environment 100, a computing resource service provider, via distinct read-write database servers 106, 108, allocates unique identifiers to distinct resources 102, 104. The computing resource service provider may host a variety of services in multiple locations worldwide. Each of these locations may include one or more data regions, which may be used by a customer to access the services provided by the computing resource service provider and to generate a variety of resources that may be used to support its business. Each independent data region may comprise a number of isolated locations, or data zones, which may be designed to be isolated from other data zone failures. Each data zone within a data region may be connected through one or more links which may allow a customer to generate one or more replicas of the customer's resources in other data zones within the data region. Thus, if there is a failure of one data zone within a data region, the resources may still be available through a different data zone. In order to maintain this isolation, each data zone may operate using its own distinct infrastructure (e.g., servers, power supplies, cooling systems, networking systems, security systems, etc.) which may obviate the need to share common points of failure with other data zones within a data region. Thus, in the event of a failure of a particular data zone (e.g., system failure, natural disaster, terrorism, etc.), other data zones within the data region may not be affected. Data zones may be defined in various ways, including by geography, by data center, by data center cluster, by data center room, and in other ways that are not necessarily geographically defined. For example, different sets of resources in the same data center may be in different data zones if they are on separate physical or virtual networks within the data center.

In an embodiment, the computing resource service provider maintains a read-write database server 106 within a particular data zone. The read-write database server 106 may be a MySQL relational database management system or other relational database management system that maintains and stores metadata associated with resources provided by the computing resource service provider to its customers. Alternatively, the read-write database server 106 may be a noSQL database management system, other key-value store, or other data storage system that indexes values and that is not classified as a relational database. The read-write database server 106 may maintain metadata associated with the resources 102, 104 within one or more relational databases maintained by the server 106. The read-write database server 106 may support a variety of resources and services provided by the computing resource service provider. For instance, the computing resource service provider may provide a block-level data storage service, which may comprise one or more computing resources that collectively operate to store data for a customer using block-level storage devices (and/or virtualizations thereof). The block-level storage devices of the block-level data storage service may, for instance, be operationally attached to virtual computer systems provided by a virtual computer system service to serve as logical units (e.g., virtual drives) for the computer systems. A block-level storage device may enable the persistent storage of data used/generated by a corresponding virtual computer system where the virtual computer system service may only provide ephemeral data storage. Data inflation for the block-level data storage service may be enabled in response to detecting a breach of the block-level data storage service or the computing resource service provider. The resources 102, 104 may be block-level storage devices that maintain incremental backup images of virtual computer systems utilized by customers in a particular data zone.

In an embodiment, the computing resource service provider maintains a variety of database servers within different data zones. These database servers may serve various functions. For instance, the read-write database server 106 may serve various data zones by allocating resource identifiers to resources 102, 104 in response to a request to assign an identifier to each of these resources 102, 104. The resources 102, 104 may be in different data zones within a particular data region. The read-write database server 106 may be assigned to allocate resource identifiers to the resources 102, 104. The computing resource service provider may also maintain other database servers, such as database server 108, which may be used for replication of the relational databases maintained by the read-write database server 106. For instance, as the read-write database server 106 stores metadata associated with resources 102, 104, the read-write database server 106 may replicate this data onto the various other database servers, including database server 108, maintained by the computing resource service provider. These other database servers may function as read-only database servers that may provide metadata to the resources 102, 104 but are not authorized to write metadata to the relational databases.

In one embodiment, the computing resource service provider assigns a distinct resource identifier range to each database server within the various data zones in a data region. For example, as illustrated in FIG. 1, the computing resource service provider assigns the read-write database server 106 with a range of resource identifiers from 1 to M and another database server 108 with another range of resource identifiers from M+1 to N. These resource identifier ranges do not overlap in order to prevent a database server from allocating the same resource identifier to more than one resource. In an embodiment, the computing resource service provider maintains a data table that specifies, for each database server provisioned by the computing resource service provider, a resource identifier range assigned to the database server. If the computing resource service provider provisions a new database server, regardless of whether it serves as a read-write database server or as a read-only database server, the computing resource service provider may evaluate the data table to identify the available resource identifier ranges (e.g., ranges that have not been previously assigned to other servers and have not been allocated to resources). Once an available resource identifier range has been identified, the computing resource service provider may assign the resource identifier range to the newly provisioned database server.

It should be noted that while ranges are used extensively throughout the disclosure for the purpose of illustration, database servers may each be assigned with differing sets of identifiers. For instance, a database server may be assigned with even number identifiers while another database server is assigned with odd number identifiers. Similarly, if there are three distinct database servers, one database server may be assigned with identifiers having integers corresponding to 0mod3, while the other database servers may be assigned with identifiers having integers corresponding to 1mod3 and 2mod3, respectively. In some examples, database servers may be assigned with disjointed sets of identifiers or with intersecting sets where there is a low probability of two database servers selecting the same identifier.

As noted above, the computing resource service provider may utilize a read-write database server 106 to allocate resource identifiers to resources across various data zones. This read-write database server 106 may be located within a particular data zone while the resources 102, 104 may be located in distinct data zones. Further, the computing resource service provider may maintain one or more read-only database servers within data zones other than the data zone where the read-write database server 106 is located. Each of these database servers may be assigned with a distinct resource identifier range by the computing resource service provider. In an embodiment, in the event of a network partition resulting in the read-write database server 106 being partitioned out, the computing resource service provider may convert a read-only database server in another data zone into a new read-write database server 108. The read-write database server 108 may allocate resource identifiers corresponding to its assigned identifier range to resources within its data zone and other resources in other data zones to which the read-write database server 108 is made available.

During the network partition, the read-write database server 106 and the read-write database server 108 may be available to allocate resource identifiers to various resources, as requested by resource servers or customers of the computing resource service provider. As each read-write database server is assigned a unique resource identifier range, the read-write database servers 106, 108 may allocate resource identifiers from their assigned ranges. For example, as illustrated in FIG. 1, the read-write database server 106 may allocate resource identifiers in a range between 1 and M, while the read-write database server 108 may allocate resource identifiers in a range between M+1 and N. In an embodiment, as a read-write database server allocates resource identifiers to various resources, the read-write database server updates a data table to indicate the number of remaining resource identifiers that may be allocated to other resources. For example, the read-write database server, if the resource identifiers comprise numerical values, may assign the resource identifiers in numerical order starting either with the lowest or highest possible resource identifier value. Similarly, if the resource identifiers comprise alphabetical values, the read-write database server may allocate these resource identifiers in alphabetical order. While numerical and alphabetical values are used throughout the present disclosure for the purpose of illustration, the resource identifiers may comprise any combination of alpha-numerical values and other characters. The read-write database server may maintain an ordering of these resource identifiers and note the remaining resource identifiers in the data table as resource identifiers are allocated.

In an embodiment, if a read-write database server exhausts its assigned range of resource identifiers, the read-write database server transmits a request to the computing resource service provider to obtain a new range of resource identifiers that may be allocated to the resources provided by the computing resource service provider. Alternatively, if the computing resource service provider detects that a read-write database server has exhausted its assigned resource identifier range, the read-write database server may convert the read-write database server into a read-only database server and assign the read-only database server with a new resource identifier range. Further, the computing resource service provider may convert an existing read-only database server within the data zone where the read-write database server was located into a new read-write database server. Since this newly converted read-write database server was assigned a unique resource identifier range when it was provisioned by the computing resource service provider, the newly converted read-write database server may assign resource identifiers from this assigned range to resources in response to requests from servers and other hosts.

If the computing resource service provider detects that the network partition or other event has ended, the computing resource service provider may transmit instructions to the database servers to resume data replication among the database servers. In some instances, the computing resource service provider may revert the database server 108 to its original read-only state. This may cause the database server 108 to cease allocating resource identifiers from its assigned resource identifier range. In some embodiments, the computing resource service provider reconsolidates data among the various database servers by replicating the data across the fleet of database servers.

As noted above, each database server provisioned by the computing resource service provider used to store metadata corresponding to resources provided by the computing resource service provider may be assigned a unique resource identifier range. The computing resource service provider may configure a database server to perform read-write operations, whereby the database server may store metadata corresponding to resources and assign resource identifiers to resources provided by the computing resource service provider. Additionally, the computing resource service provider may configure a database server to perform read-only operations, whereby the database server may provide information regarding the resources provided by the computing resource service provider but may not be authorized to assign resource identifiers in response to incoming requests from servers and other hosts. However, these read-only database servers are also assigned with a unique resource identifier range, as these read-only database servers may be converted into read-write database servers in the event of a network partition or other event that may necessitate activation of more read-write database servers. Accordingly, FIG. 2 shows an illustrative example of an environment 200 in which distinct resource identifiers are assigned to database servers of a block-level data storage system to prevent identifier overlap in the event of a network partition in accordance with at least one embodiment.

In the environment 200, the computing resource service provider maintains at least two distinct data zones: a first data zone 206 and a second data zone 208. As noted above, these data zones 206, 208 may be designed to be isolated from other data zone failures. Each data zone within a data region may be connected through one or more links which may allow a customer to generate one or more replicas of the customer's resources in other data zones within the data region. In the event of a failure of a particular data zone other data zones within the data region may not be affected. In an embodiment, each data zone 206, 208 includes a variety of resources 202, 204 that are available to customers of the computing resource service provider and to other services provided by the computing resource service provider (e.g., data stores linked to virtual computer systems, etc.). These resources 202, 204 may include virtual computer systems, databases, data storage devices, and the like. Additionally, these data zones 206, 208 may include one or more database servers that may be used to store metadata corresponding to each of these resources 202, 204.

Figure 2:
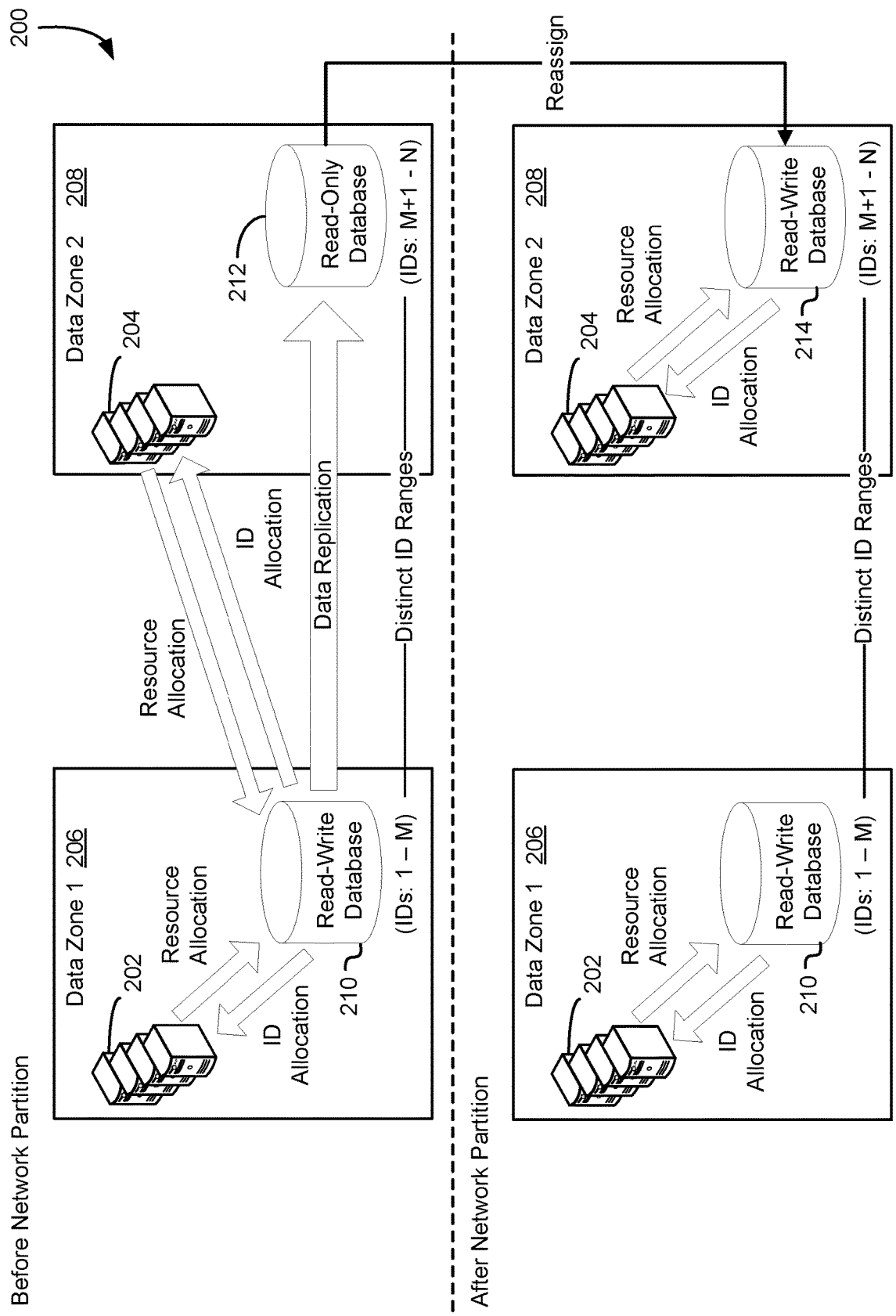
FIG. 2 shows an illustrative example of an environment in which distinct resource identifiers are assigned to database servers of a block-level data storage system to prevent identifier overlap in the event of a network partition in accordance with at least one embodiment.

As illustrated in FIG. 2, the data zone 206 includes a read-write database server 210. The read-write database server 210 stores metadata corresponding to resources 202, 204 within one or more databases. This metadata is replicated on to other database servers within the various data zones within the data region. This is performed such that if there is a data zone failure or other event that would render the read-write database 210 unavailable, the metadata remains accessible via other database servers within other data zones. In an embodiment, the read-write database server 210 allocates resource identifiers in response to requests from customers, servers, or other resource hosts within the data zones 206, 208. The read-write database server 210 may be assigned with a unique resource identifier range (e.g., identifiers 1 through M, as illustrated in FIG. 2), from which the read-write database server 210 may allocate resource identifiers to the resources 202, 204 in response to the requests from the customers, servers, or other resource hosts within the data zones 206, 208. As resource identifiers are allocated by the read-write database server 210, the read-write database server 210 may update a data table within the server to indicate the number of remaining resource identifiers available for allocation. In an embodiment, the resource identifiers are allocated in accordance with an ordering of resource identifiers. For instance, if the resource identifiers are numeral-based, the resource identifiers may be allocated in numerical order. Thus, based at least in part on the number of remaining resource identifiers that can be allocated, the read-write database 210 may identify the next resource identifier that may be allocated.

As the read-write database server 210 allocates resource identifiers to resources 202, 204 within the data zones 206, 208, the read-write database server 210 may transmit information to a read-only database 212 within data zone 208 to replicate the data stored within the read-write database server 210. In an embodiment, the read-only database server 212 is assigned with a unique resource identifier range, even though the read-only database server 212 is not authorized to allocate resource identifiers from its assigned range to resources 202, 204. The read-only database server 212 may, however, may store data from the read-write database 210 and provide metadata associated with resources 202, 204 to customers and other entities upon request.

In an embodiment, if the computing resource service provider detects a network partition or other event that causes the read-write database server 210 to be partitioned out (e.g., made only available through its own data zone 206 or otherwise disabled), the computing resource service provider may reassign the read-only database server 212 within data zone 208 into a new read-write database server 214. As noted above, each provisioned database server may be assigned with a unique resource identifier range, from which the database server may allocate resource identifiers to resources. The read-write database server 214 may allocate resource identifiers within its assigned range (e.g., M+1 through N, as illustrated in FIG. 2) to resources 204 within its data zone 208 after the network partition resulting in the partitioning out of the read-write database server 210. This unique resource identifier range is assigned to the read-write database server 214 by the computing resource service provider when it is initially provisioned. Thus, prior to the network partition, the read-only database server 212 may have maintained this unique identifier range, now made available to resources 204 by virtue of the read-only database server 212 being reassigned as a read-write database server 214 for the data zone 208. Similar to the read-write database server 210, the read-write database server 214 may update a data table within the server to indicate the number of remaining resource identifiers available for allocation as resource identifiers from its assigned range are allocated to resources 204.

In an embodiment, if a read-write database server 210, 214 exhausts its assigned range of resource identifiers, the read-write database server transmits a request to the computing resource service provider to obtain a new range of resource identifiers that may be allocated to the resources provided by the computing resource service provider. In response to the request, the computing resource service provider evaluates a data table specifying assigned resource identifier ranges to identify any available identifier ranges that may be assigned. If an identifier range is available, the computing resource service provider may assign the identifier range to the read-write database server and update the data table to record this assignment. In another embodiment, if the computing resource service provider determines that a read-write database server 210, 214 has exhausted its assigned range of resource identifiers, the computing resource service provider may assign a new resource identifier range to the read-write database server 210, 214 and converts the read-write database server into a read-only database server. Further, the computing resource service provider may identify a read-only database server having the next available resource identifier range and convert this read-only database server into a read-write database server. Thus, this new read-write database server may allocate resource identifiers from its previously assigned resource identifier range prior to the read-only database servers being reassigned as read-write database servers and allocating resource identifiers from their newly assigned ranges.

Figure 3:
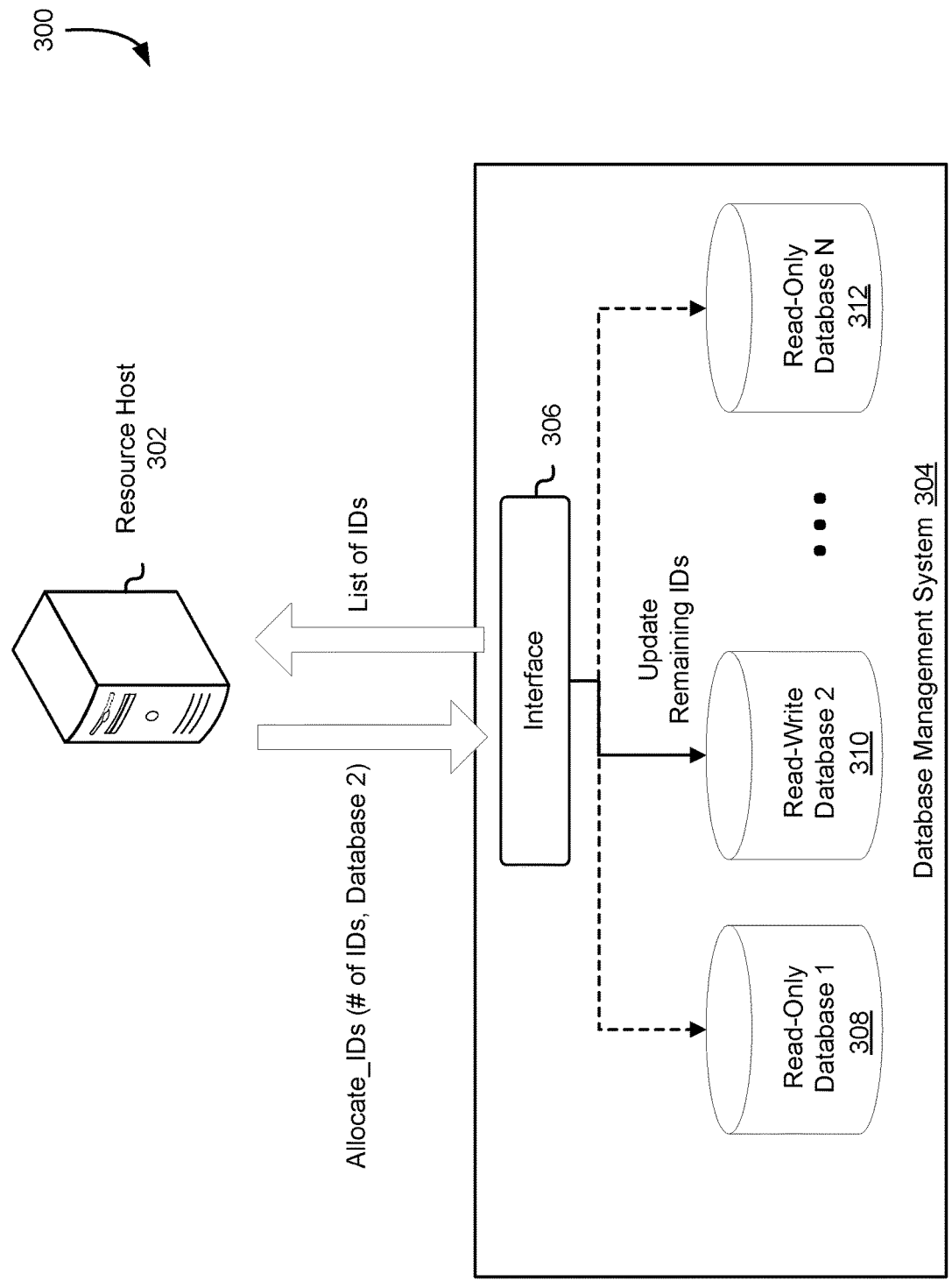
FIG. 3 shows an illustrative example of an environment in which a request to obtain a set of identifiers from a read-write database server is processed in accordance with at least one embodiment.

As noted above, a customer of the computing resource service provider, via a server host, may transmit a request to a read-write database server to allocate one or more resource identifiers to the customer's resources, which may be maintained by the server host within the computing resource service provider network. The request may specify the number of resource identifiers required by the customer, as well as an identifier corresponding to the read-write database server that is to allocate the requested resource identifiers. This may cause the selected read-write database server to identify its assigned resource identifier range and allocate a set of resource identifiers from this range. Accordingly, FIG. 3 shows an illustrative example of an environment 300 in which a request to obtain a set of identifiers from a read-write database server is processed in accordance with at least one embodiment.

In the environment 300, a resource host 302 transmits a request to an interface 306 of a database management system 304 to obtain a set of resource identifiers for one or more resources maintained by the resource host 302. The database management system 304 may comprise one or more computer systems of the computing resource server provider that maintains the various database servers within a data region. The database management system 304 may further maintain the data table utilized by the interface 306 and the various read-write database servers 308 to identify resource identifiers that may be allocated to resources. In an embodiment, the request is an application programming interface (API) call to the interface 306, where the request specifies the number of resource identifiers needed by the resource host 302 for allocation to its resources and an identifier corresponding to the read-write database server that is to allocate the resource identifiers. The interface 306 may be a web server, a cluster of web servers, a load balancer, or other computer system that processes incoming requests from resource hosts 302 to obtain resource identifiers or other data from a read-write database server 310. Further, the interface 306 may obtain metadata associated with various resources from other database servers managed by the database management system 304, such as from the read-only database servers 308, 312 and the read-write database server 310. In an embodiment, the database management system 304 maintains a single read-write database server 310 and other read-only database servers 308, 312, which may replicate data maintained within the fleet of database servers. Alternatively, the database management system 304 may maintain a variety of read-write servers within the fleet of database servers. For instance, in the event of a network partition or other event rendered a read-write database server unavailable, the other read-write database servers may handle the demand for identifiers and other information. As noted above, the read-write database server 310 and the read-only database servers 308, 312 may each be assigned with a unique range of resource identifiers which each database server, if in a read-write state, may allocate in response to requests from resource hosts for allocation of resource identifiers.

The assignment of a unique resource identifier range may be performed by the interface 306, which may maintain a data table specifying the resource identifier ranges assigned to the various database servers within the database management system 304. For instance, when a database server is provisioned, the interface 306 evaluates the data table to identify an available range of resource identifiers that may be assigned to the database server. In some embodiments, the interface 306 identifies the data zone within which the database server is provisioned and estimates the demand for resource identifiers within the data zone. This may include evaluating data logs for the data zone to identify the frequency at which resource identifiers are allocated to resources within the data zone. Using this information, the interface 306 may determine the number of resource identifiers that may be assigned to the newly provisioned database server and the corresponding range for these resource identifiers. The interface 306 may update the data table to create an association between the range of resource identifiers and an identifier for the newly provisioned database server.

Each database server, including the read-write database server 310 and the read-only database servers 308, 312, may be assigned with a particular server identifier upon being provisioned by the computing resource service provider. The interface 306 may update its data table to introduce an entry corresponding to each of these server identifiers. Further, as described above, the interface 306 may assign a unique resource identifier range to each database server, which may be specified in the database server entries within the data table. As noted above, some database servers within the database management system 304 may function as read-only database servers, which may be authorized to maintain metadata associated with resources maintained by resource hosts but may otherwise be prohibited from performing write operations, including allocating resource identifiers to resources. A database server may be assigned to function as a read-write database server, such as read-write database server 310, which may allocate resource identifiers in response to requests from resource hosts.

The database servers maintained by the database management system 304 may be located within various data zone in a particular data region. Resource hosts within a particular data zone may, via the database management system 304, identify which read-write database server is available for the allocation of resource identifiers. For instance, a resource host 302 may submit a request to the interface 306 of the database management system 304 to identify the available read-write database server that the resource host 302 may submit requests to. The interface 306 may identify the data zone in which the resource host 302 is located and identify, based at least in part on the identification of the data zone, a read-write database server that serves this particular data zone. The interface 306 may provide this information to the resource host 302. In an alternative embodiment, the interface 306 provides, periodically or in response to an event (e.g., a network partition, detected maintenance on a database server, etc.), identifiers corresponding to read-write database servers that may be accessed by a corresponding resource host.

At any time, a resource host 302 may submit a request to the interface 306 to obtain one or more resource identifiers for resources maintained by the resource host 302. For example, if the resource host 302 maintains a new backup image for a virtual computer system, the resource host 302 may submit a request to obtain a resource identifier that can be allocated to the new backup image. Thus, metadata corresponding to the new backup image may be stored in a database server and accessible by the resource host 302 or a customer of the computing resource service provider. In an embodiment, the request is an API call to the interface 306, where the API call specifies the number of resource identifiers that are being requested and an identifier corresponding to a read-write database server that may allocate the requested resource identifiers.

In response to the request, the interface 306 evaluates the request to identify the specified read-write database server selected by the resource host 302. The interface 306 may access its data table to determine whether the specified read-write database server is available for allocation of the requested resource identifiers. If the particular read-write database server is not available (e.g., the read-write database server has been partitioned out, the read-write database server is undergoing maintenance, etc.), the interface 306 may transmit a notification to the resource host 302 indicating that the requested identifiers are not available from the selected read-write database server. Additionally, the interface 306 may evaluate the data table to determine if the selected read-write database server has sufficient resource identifiers to fulfill the request. For example, the data table may specify the remaining number of identifiers within the range assigned to the read-write database server. If the read-write database server does not have sufficient resource identifiers to fulfill the request, the interface 306 may transmit a notification to the resource host 302 to indicate that the requested identifiers are not available.

If the selected read-write database server is available and has the requisite number of resource identifiers available, the interface 306 may transmit the request to the selected read-write database server. For example, as illustrated in FIG. 3, if the resource host 302 selected "Database 2" for its resource identifiers, the interface 306 may evaluate its data table to identify the read-write database server that has the identifier "Database 2." In this particular example, the interface 306 identifies read-write database server 310 from the various database servers maintained by the database management system 304 and transmits the request from the resource host 302 to the read-write database server 310.

In response to the request from the resource host 302, the read-write database server 310 queries the data table by using its identifier (e.g., "Database 2") as a query entry to identify an entry corresponding to the read-write database server 310. The read-write database server 310 may evaluate this entry to identify its assigned resource identifier range, as well as the number of remaining resource identifiers within its assigned resource identifier range. Using the assigned resource identifier range and the number of remaining resource identifiers that may be assigned from this range, the read-write database server 310 calculates the resource identifiers that may be allocated to fulfill the request. For example, the read-write database server 310 may identify the upper bound of the resource identifier range (if the resource identifiers are numerical values) and subtract the number of remaining identifiers from this upper bound to obtain the value of the first resource identifier that may be allocated in response to the request. Accordingly, the read-write database server 310 may identify the values for each resource identifier and provide these resource identifiers to the resource host 302, fulfilling the request. Additionally, the read-write database server 310 may update the data table to specify a new value corresponding to the remaining resource identifiers that may be allocated from the server's assigned resource identifier range.

In an embodiment, the interface 306 evaluates the data table to determine whether any database servers 308-312 are about to exhaust their allotted range of resource identifiers. For instance, the interface 306 may evaluate each allotted range of resource identifiers to determine whether the remaining number of resource identifiers for a particular resource identifier range is below a threshold value. If the number of remaining resource identifiers within a particular range falls below the threshold value, the interface 306 may assign a new resource identifier range to the corresponding read-write database server by updating its entry to specify this new range of resource identifiers. Thus, if a read-write database server exhausts its initial range of resource identifiers, it may continue to provide resource identifiers from the newly assigned range of resource identifiers. In some embodiments, if the interface 306 detects that a read-write database server is about to exhaust its allotted range of resource identifiers, the interface 306 converts a read-only database server 308, 312 from the database management system 304 into a read-write database server and makes the allotted range of resource identifiers of this newly converted read-write database server available for allocation. The interface 306 may select a read-only database server that is in the data zone of the read-write database server or that can at least service the data zones assigned to the read-write database server that is close to exhausting its range of resource identifiers. In some instances, the interface 306 may convert the read-write database server that may be close to exhausting its range of resource identifiers into a read-only database server and assign this read-only database server with a new range of resource identifiers. This may enable other database servers to exhaust their ranges of resource identifiers before any newly assigned ranges are utilized.

Figure 4:
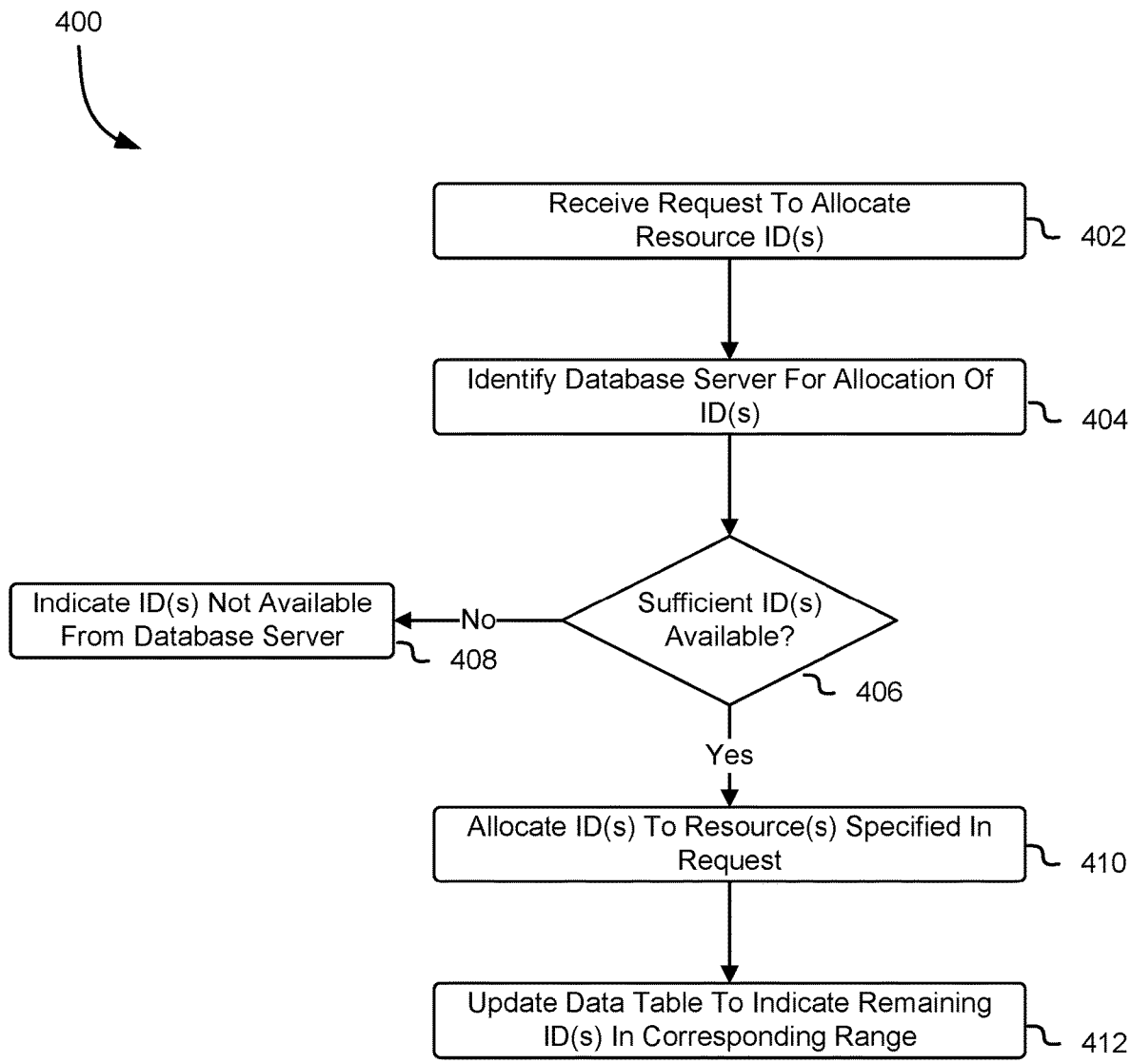
FIG. 4 shows an illustrative example of a process for allocating resource identifiers in response to a request in accordance with at least one embodiment.

As noted above, a read-write database server may process incoming requests from resource hosts and other entities to allocate resource identifiers to resources maintained by these resource hosts. The read-write database server may utilize a data table maintained by an interface of a database management system to determine whether the read-write database server has a sufficient number of resource identifiers to fulfill the request. Further, the read-write database server may update this data table to indicate the number of remaining resource identifiers that may be allocated to various resources. Accordingly, FIG. 4 shows an illustrative example of a process 400 for allocating resource identifiers in response to a request in accordance with at least one embodiment. The process 400 may be performed by any read-write database server that is assigned with a range of resource identifiers that may be allocated to resources provided by a computing resource service provider. It should be noted that some elements of the process 400 may also be performed by an interface of a database management system that maintains the read-write database servers.

At any time, an interface of a database management system may receive 402 a request from a resource host or from a customer of the computing resource service provider to allocate one or more resource identifiers to resources maintained by the resource host. The request, in some embodiments, is an API call that specifies an identifier corresponding to a read-write database server that can allocate resource identifiers and the number of resource identifiers requested by the resource host or customer for its resources. In response to the request, the interface may evaluate the request to identify 404 the read-write database server that may allocate the requested number of resource identifiers. In an embodiment, the interface evaluates a data table specifying entries for each database server and their assigned resource identifier ranges to determine whether the database server specified in the request is active as a read-write database server. For instance, if the specified database server has been partitioned out such that it is no longer available to the resource host, the interface may deny the request. Similarly, the request may be denied if the specified database server is unavailable due to maintenance, malfunction, or has been converted into a read-only database server as described above.

If the read-write database server is available, the interface may evaluate its data table to determine 406 whether the read-write database server has sufficient resource identifiers available to fulfill the request. The data table maintained by the interface of the database management system may specify, within each entry corresponding to a database server, one or more corresponding resource identifier ranges assigned to the database server. Further, for each corresponding resource identifier range, the entry may specify the number of remaining identifiers within the range that may be allocated to resources. The interface may evaluate the entry corresponding to the read-write database server and determine whether the remaining number of resource identifiers is greater than the number of resource identifiers requested. In some embodiments, the interface determines whether the remaining number of resource identifiers for the particular ranges assigned to the read-write database server is below a threshold value. If the number of available resource identifiers is below the threshold value, the interface may determine that the read-write database server does not have sufficient available resource identifiers to fulfill the request. This may prevent errors in the event multiple requests for identifiers within the ranges assigned to the read-write database server are received within a short amount of time.

If the interface determines that the specified read-write database server does not have sufficient resource identifiers available to fulfill the request, the interface may indicate 408 that the identifiers are not available from the database server. For instance, the interface may transmit a notification to the resource host indicating that the request could not be fulfilled. Further, the interface may specify an identifier of another read-write database server that may allocate the resource identifiers requested by the resource host. This may enable the resource host to generate a new request that specifies the identifier of this other read-write database server. In some embodiments, if the interface identifies another read-write database server that is available to the resource host and has sufficient resource identifiers to fulfill the request, the interface may transmit the request to this other read-write database server for fulfillment.

If the identified read-write database server has sufficient resource identifiers within its assigned resource identifier ranges to fulfill the request, the interface may transmit the request from the resource host to the identified read-write database server for fulfillment. In response to receiving the request from the interface, the read-write database server may access the data table maintained by the interface to identify its assigned resource identifier ranges. From the data table, the read-write database server may identify the upper and lower bounds of its assigned ranges, as well as the number of remaining identifiers within each of these ranges. Using the number of remaining resource identifiers and the upper and lower bounds of the corresponding ranges, the read-write database server may calculate the resource identifiers that may be allocated to the resource host for its resources. For example, the read-write database server may subtract the remaining number of resource identifiers from the upper bound of a corresponding resource identifier range to identify the next resource identifier that may be allocated.

The read-write database server may provide 410 the allocated resource identifiers to the interface for dissemination to the resource host or other entity that submitted the request. Additionally, in an embodiment, the read-write database server accesses the data table maintained by the interface to update 412 the number of remaining resource identifiers in the corresponding one or more ranges from which the resource identifiers were allocated. For instance, the read-write database server may subtract the number of resource identifiers allocated in response to the request from the previous value corresponding to the number of remaining resource identifiers, resulting in a new number of remaining resource identifiers. This may be used by the interface to determine whether to assign new resource identifier ranges to the read-write database server or to suspend further allocation of resource identifiers by the read-write database server (e.g., the new value is below a threshold value, etc.).

Figure 5:
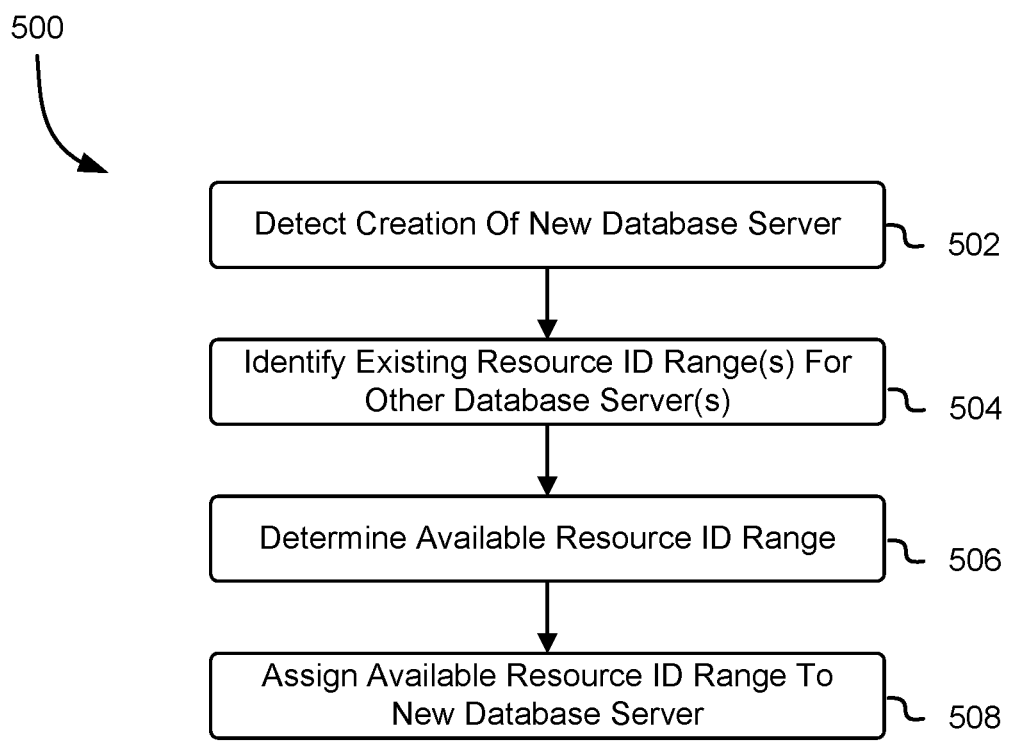
FIG. 5 shows an illustrative example of a process for assigning a distinct identifier range to a new database server partition in response to the creation of the new database server partition in accordance with at least one embodiment.

As noted above, if a new database server is provisioned for use in storing metadata associated with one or more resources, the computing resource service provider, via a database management system, may assign a resource identifier range to the new database server. If the database server is configured by the database management system to function as a read-write database server, the database server may process incoming requests to allocate resource identifiers to various resources. Alternatively, if the database server is configured as a read-only database server, the database server may store data associated with the resources but may not allocate resource identifiers from its assigned range until it is converted into a read-write database server by the database management system. Accordingly, FIG. 5 shows an illustrative example of a process 500 for assigning a distinct identifier range to a new database server partition in response to the creation of the new database server partition in accordance with at least one embodiment. The process 500 may be performed by the aforementioned database management system, which may assign resource identifiers to newly provisioned database servers.

The computing resource service provider, via a database management system, may provision a new database server to support the needs within a data zone or in various data zones. For instance, the computing resource service provider may provision a new database server in order to provide additional data redundancy within a data region via data replication across the data zones of the data region. Alternatively, the computing resource service provider may provision a new database server in response to a triggering event, such as another database server being offline due to maintenance or other issue that causes the database server to become unavailable for use. In response to the computing resource service provider provisioning this new database server, the database management system may detect 502 the creation of this new database server.

In response to detecting creation of this new database server, the database management system may identify 504 the existing resource identifier ranges previously assigned to other database servers in the fleet (e.g., within the data region and utilized within the various data zones of the data region). For instance, the database management system may access a data table that specifies, for each database server within the data region, an entry corresponding to the database server. An entry in the data table may specify an identifier corresponding to a database server, as well as the ranges of resource identifiers assigned to the database server. Each range may specify an upper bound (e.g., highest resource identifier value assignable, etc.) and a lower bound (e.g., lowest resource identifier value assignable, etc.). Additionally, the entry may specify the number of remaining resource identifiers that may be assigned within an assigned range. This number, along with the upper and lower bounds for the range, are used by the corresponding database server to identify the next resource identifier that may be allocated to a resource in response to a request for resource identifiers. As resource identifiers are allocated, the database server may update the entry to specify the new number of remaining resource identifiers.

Using the existing resource identifier ranges assigned to other database servers as reference, the database management system may determine 506 the available resource identifier ranges that may be assigned to the newly provisioned database server. For instance, the database management system may determine, using data logs corresponding to the data zone where the newly provisioned database server is located, the frequency at which resource identifiers are allocated to resources within the data zone. Alternatively, the database management system may receive data from each database server, where the data indicates a frequency at which the corresponding database server is allocating resource identifiers. Using this information, the database management system may determine the anticipated frequency at which the database server may allocate resource identifiers. The database management system may utilize this anticipated frequency to determine a number of resource identifiers that can be assigned to the newly provisioned database server. Further, based at least in part on the identified existing resource identifier ranges and the number of resource identifiers that can be assigned to the newly provisioned database server, the database management system may determine the upper and lower bounds of the resource identifier range that is to be assigned to the newly provisioned database server.

The database management system may update the data table to include an entry corresponding to the newly provisioned database server. Within this entry, the database management system may assign 508 the available resource identifier range to the newly provisioned database server. For instance, the database management system may update the new entry to specify the identified upper and lower bounds of the assigned resource identifier range. Further, the database management system may specify, in the entry for the database server, the number of remaining resource identifiers within this new range. Since no resource identifiers have been allocated to resources from this range, the number of remaining resource identifiers specified in the entry may correspond to the difference between the upper and lower bound of the range. It should be noted that while a resource identifier range is assigned to the database server, if the database server is configured as a read-only database server, the database server may not be authorized to allocate any identifiers within its assigned resource identifier range. However, if the database server is configured as a read-write database server, the database server may begin allocating resource identifiers from its assigned resource identifier range.

Figure 6:
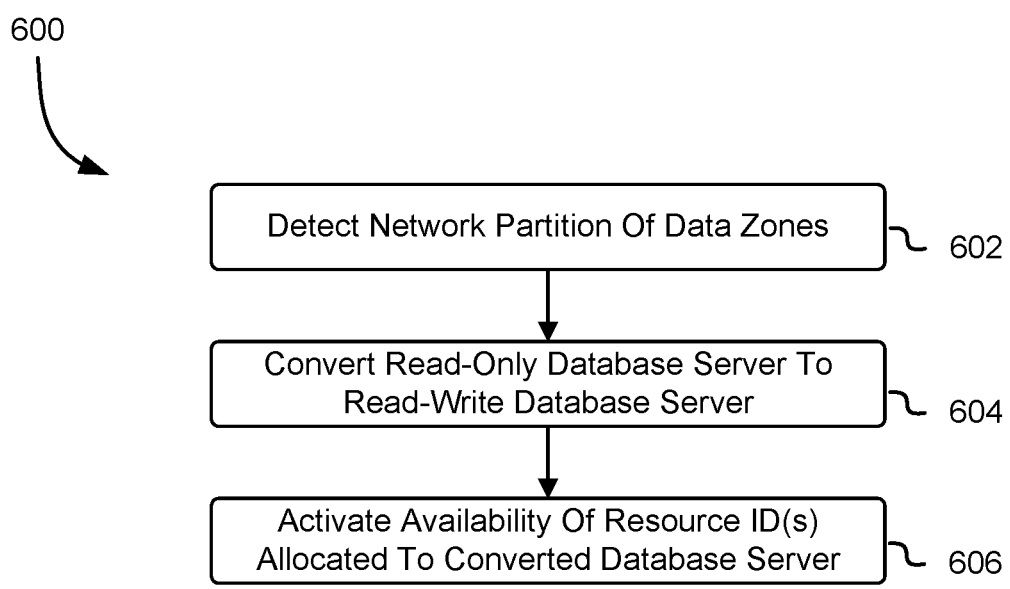
FIG. 6 shows an illustrative example of a process for activating a read-write database server for allocation of resource identifiers within an assigned range in response to a network partition in accordance with at least one embodiment.

As noted above, in the event of a network partition or other event that renders a read-write database unavailable for use within one or more data zones, the computing resource service provider, via a database management system, may convert an existing read-only database server within the one or more data zones into a read-write database server. This may enable the read-write database server to process incoming requests to allocate resource identifiers to resources within the one or more data zones. Accordingly, FIG. 6 shows an illustrative example of a process 600 for activating a read-write database server for allocation of resource identifiers within an assigned range in response to a network partition in accordance with at least one embodiment. The process 600 may be performed by the database management system, which may monitor the database servers within the various data zones to detect network partitions or other events that may render a read-write database server unavailable for one or more data zones within the data region.

At any time, the database management system may detect 602 a network partition of data zones within a particular data region. For instance, the database management system may detect that a data replication process between database servers in different data zones could not be completed due to a network disconnect between the different data zones. In some embodiments, the database management system receives an alarm notification from database servers impacted by the network partition. The notification may indicate the nature of the network partition. It should be noted that while network partitions are utilized throughout the present disclosure for the purpose of illustration, other events may be detected by the database management system that may indicate the unavailability of a database server within a data zone. For example, the database management system may detect if a data server is rendered offline due to scheduled maintenance.

In response to the network partition or other event leading to the unavailability of a read-write database server for other data zones, the database management system may convert 604 a read-only database server within an impacted data zone (e.g., a data zone other than the data zone where the partitioned out read-write database server is located) into a read-write database server. For instance, the database management system may access the data table specifying entries for each database server managed by the database management system to identify an entry corresponding to the read-only database server that is to be converted. The entry may specify the actions the database server is authorized to perform. For the read-only database server, the database management system may modify its entry to authorize the read-only database server to allocate resource identifiers from its assigned resource identifier range. Thus, through modification of this entry and the permissions specified therein, the database management system may convert the read-only database server into a read-write database server.

The database management system may activate 606 the availability of the resource identifiers within the range assigned to the converted read-write database server. This may be performed by modifying the entry corresponding to the database server to specify that it is authorized to allocate resource identifiers. Further, the database management system may transmit a notification to the database server to indicate that it is now authorized to accept requests from resource hosts and other entities to allocate resource identifiers. Thus, if an interface of the database management system receives a request to allocate a resource identifier, and the request specifies an identifier of the converted database server, the interface may determine, based at least in part on the entry corresponding to the database server, that the database server may fulfill the request. Further, upon receiving the request from the interface, the database server may allocate the resource identifiers, as it is authorized to do so by the database management system.

Figure 7:
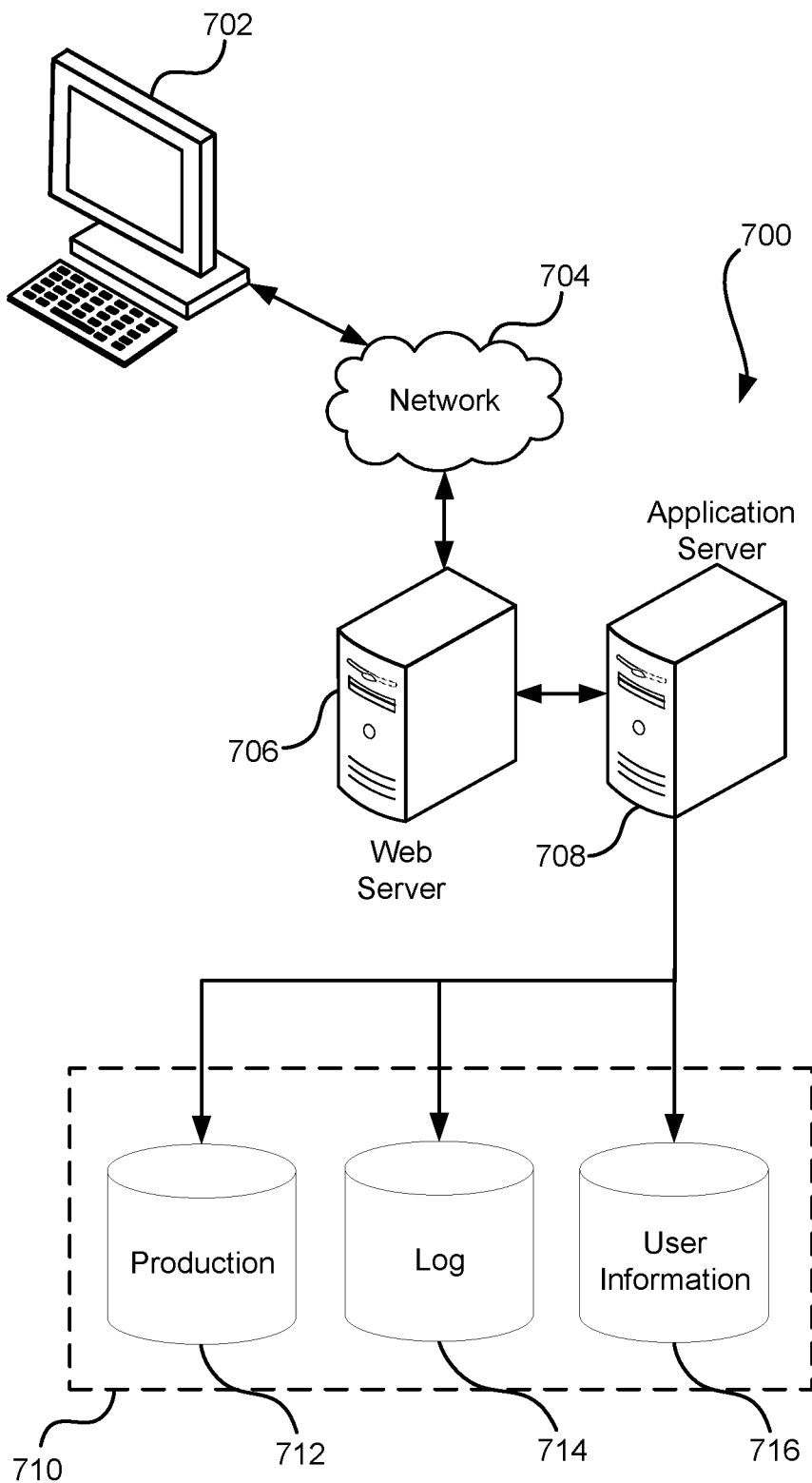
FIG. 7 shows an illustrative example of an environment in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update or otherwise process data in response thereto and the application server 708 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
provisioning a first database server for allocation of identifiers assignable to computing resources of a service provider, the first database server being in a read-only state and storing a replica of data stored in a second database server, the second database server being in a read-write state;

identifying, based at least in part on existing identifier ranges assigned to other database servers, an identifier range, wherein the identifier range is disjoint from other identifier ranges assigned to the other database servers;
updating an entry within a table to indicate assignment of the identifier range to the first database server;
storing, on the first database server, the identifier range exclusive of the other identifier ranges;
determining, in response to a network partition, that the second database server is no longer available for allocation of identifiers; and
as a result of the determining:
converting the first database server from the read-only state into the read-write state; and
allocating identifiers from the identifier range.

2. The computer-implemented method of claim 1, further comprising:
detecting that the first database server has allocated the identifiers from the identifier range; and
assigning a new identifier range to the first database server, the new identifier range being distinct from the other identifier ranges and the identifier range.

3. The computer-implemented method of claim 1, further comprising updating, in response to the first database server allocating an identifier from the identifier range, the table to indicate a remaining number of identifiers within the identifier range.

4. The computer-implemented method of claim 1, further comprising:
obtaining, from database servers within a data region, information indicating a frequency at which identifiers are allocated by the database servers; and
determining, based at least in part on the frequency, the identifier range.

5. A system, comprising:
one or more processors; and
memory that stores computer-executable instructions that, if executed, cause the system to:
assign a first set of identifiers to a first database server, the first database server provisioned in a read-only state and including replicated data from a second database server, the second database server assigned a second set of identifiers, the first set of identifiers and second set of identifiers being disjoint;
detect an event that causes the second database server to lose an ability to allocate identifiers to resources; and
in response to detection of the event:
convert the first database server to read-write; and
cause the first database server to allocate identifiers to resources from the first set of identifiers.

6. The system of claim 5, wherein execution of the computer-executable instructions further causes the system to:
identify existing sets of identifiers assigned to other servers for allocation to the resources, the other database servers including the first database server; and
assign a third set of identifiers to the first database server based at least in part on the existing sets of identifiers assigned to the other database servers.

7. The system of claim 6, wherein execution of the computer-executable instructions that cause the system to assign the third set of identifiers to the second database server further causes the system to:
determine a frequency at which other database servers allocate another set of identifiers to the resources; and
identify a size for the third set of identifiers based at least in part on the frequency.

8. The system of claim 6, wherein assignment of the third set of identifiers to the first database server is performed in response to receiving an indication that the first database server has been provisioned.

9. The system of claim 5, wherein the event is a network partition that prevents the first database server from communicating with the second database server.

10. The system of claim 5, wherein execution of the computer-executable instructions further causes the system to:
receive an indication that the first database server has allocated at least one identifier from the first set of identifiers to a resource; and
update a table to indicate a remaining number of identifiers within the first set of identifiers, the remaining number of identifiers identifying a next identifier to be allocated by the first database server.

11. The system of claim 5, wherein execution of the computer-executable instructions further causes the system to:
obtain an indication that the first database server has exhausted the first set of identifiers; and
assign a third set of identifiers to the second database server for allocation to the resources.

12. The system of claim 5, wherein execution of the computer-executable instructions further causes the system to convert the first database server from a read-only state to a read-write state to enable the first database server to allocate the first set of identifiers.

13. A non-transitory computer-readable storage medium, wherein the non-transitory computer-readable storage medium includes hardware storing thereon executable instructions that, as a result of being executed by one or more processors of a computer system, cause the computer system to at least:
provision a first server, the first server replicating resources managed by a second server, the first server being read-only, the second server assigning a first set of identifiers to resources;
identify, based at least in part on the first set of identifiers, a second set of identifiers different from the first set of identifiers;
assign the second set of identifiers to the first server;
detect an event that causes the second server to lose an ability to allocate the first set of identifiers to the resources; and
convert the first server to read-write to cause the first server to allocate identifiers to the resources from the second set of identifiers.

14. The non-transitory computer-readable storage medium of claim 13, wherein:
the first server is provisioned in a read-only state; and
execution of the instructions that cause the computer system to cause the first server to assign the identifiers from the second set of identifiers further causes the computer system to convert the first server from the read-only state to a read-write state.

15. The non-transitory computer-readable storage medium of claim 13, wherein execution of the instructions further causes the computer system to:
determine, based at least in part information from the other servers that specifies assignment of identifiers from existing sets of identifiers, a frequency at which the identifiers from the existing sets of identifiers are assigned; and generate the set of identifiers based at least in part on the frequency.

16. The non-transitory computer-readable storage medium of claim 13, wherein the event is maintenance of the second server that causes the second server to become offline.

17. The non-transitory computer-readable storage medium of claim 13, wherein execution of the instructions further causes the computer system to:
   detect allocation of an identifier from the second set of identifiers; and
   update a table specifying the set of identifiers to indicate a number of remaining identifiers of the second set of identifiers, the number being usable to determine a next identifier to be allocated by the first server from the second set of identifiers.

18. The non-transitory computer-readable storage medium of claim 13, wherein execution of the instructions further causes the computer system to:
   detect that first server has allocated a number of identifiers from the second set of identifiers that exceeds a threshold value; and
   assign a new set of identifiers to the first server as a result of the threshold value being exceeded.

19. The non-transitory computer-readable storage medium of claim 13, wherein the event is a network partition that prevents the second server from communicating with the first server to provide the assignments of identifiers to the resources from the second server.

20. The non-transitory computer-readable storage medium of claim 13, wherein execution of the instructions that cause the computer system to assign the second set of identifiers to the first server further causes the computer system to update a data table to indicate assignment of the second set of identifiers to the first server, the data table preventing previously assigned identifiers of the second set of identifiers from being assigned to the other servers.

* * * * *